US008062545B2

(12) United States Patent
Lievens et al.

(10) Patent No.: US 8,062,545 B2
(45) Date of Patent: Nov. 22, 2011

(54) ANTIFREEZE CONCENTRATE, COOLANT COMPOSITION, AND PREPARATION THEREOF

(75) Inventors: Serge S. Lievens, Merelbeke (BE); Jurgen P. DeKimpe, Ghent (BE)

(73) Assignee: Chevron U.S.A Inc., San Ramon, CA (US)

( * ) Notice: Subject to any disclaimer, the term of this patent is extended or adjusted under 35 U.S.C. 154(b) by 0 days.

(21) Appl. No.: 12/852,847

(22) Filed: Aug. 9, 2010

(65) Prior Publication Data

US 2011/0006250 A1    Jan. 13, 2011

Related U.S. Application Data

(63) Continuation-in-part of application No. 11/769,943, filed on Jun. 28, 2007, now Pat. No. 7,790,054.

(51) Int. Cl.
*C09K 5/00* (2006.01)

(52) U.S. Cl. ............... 252/71; 252/73; 252/74; 252/76; 252/77

(58) Field of Classification Search ............. None
See application file for complete search history.

(56) References Cited

U.S. PATENT DOCUMENTS 6,080,331 A * 6/2000 Meszaros et al. ............ 252/79
6,802,988 B1 * 10/2004 Wenderoth et al. .......... 252/73

* cited by examiner

*Primary Examiner* — Necholus Ogden, Jr.
(74) *Attorney, Agent, or Firm* — Penny L. Prater

(57) ABSTRACT

An antifreeze composition having improved thermal stability is provided. In one embodiment, the antifreeze concentrate composition comprises from 50 to 99.8 wt. % of a glycol-based freezing point depressant selected from the group of: alkylene glycols, glycol monoethers, glycerins, and mixtures thereof; 0.01 to 10 wt. % of at least one of a 2-ethylhexanoic acid, isononanoic acid and 3,5,5-trimethylhexanoic acid; and 0.01 to 5 wt. % of at least one of octanoic acid, nonanoic acid, decanoic acid, undecanoic acid, dodecanoic acid, neodecanoic acid, benzoic acid, 2-hydroxybenzoic acid, p-terbutylbenzoic acid, and mixtures thereof. In one embodiment, the composition is employed as a concentrate in admixture with 10 to 90 wt. % water. In one embodiment no more than one dicarboxylic acid is used as an additive. In another embodiment no dicarboxylic acid is present.

4 Claims, No Drawings

ANTIFREEZE CONCENTRATE, COOLANT COMPOSITION, AND PREPARATION THEREOF

CROSS-REFERENCE TO RELATED APPLICATIONS

This application is a continuation-in-part of application U.S. Pat. Ser. No. 11/769,943, filed Jun. 28, 2007, now U.S. Pat. No. 7,790,054 and claims priority therefrom.

FIELD OF THE INVENTION

The invention relates generally to antifreeze compositions exhibiting improved thermal stability at low temperatures.

BACKGROUND

It is known to use antifreeze compositions in heat exchanging systems and/or for de-icing applications. In these applications, the antifreeze compositions come in contact with various metals, alloys, and other components forming the different parts of the heat exchanging system or the system to be de-iced. Efforts have been made towards the protection from corrosion of parts and components in contact with the antifreeze compositions. Prior art solutions include the addition of various corrosion inhibitors and/or the use of different organic acids for multiple metal protection systems.

Corrosion protection is critical at all temperature ranges. However, at low temperatures, other factors important to the performance of antifreeze compositions come into play, including the unwanted formation of scale and/or deposits. Water is often used to dilute antifreeze compositions. Water quality varies greatly with geographic location, population and degree of industrialization. When hard water is used, scales can be formed from alkaline earth metal carbonate and phosphate deposition. These inorganic films tend to inhibit thermal transfer and thus reduce the heat transfer efficiency of the system. Besides the use of hard water, the use of certain corrosion inhibitors contribute to the formation of deposits, e.g., silicate gellation. Dicarboxylic acids, such as sebacic acid, can also contribute to deposit formation in some circumstances. In certain additive packages for coolants, silicate/phosphate corrosion inhibitors are used to help protect metal cooling system parts and also as a buffer to control the pH of the antifreeze. When a composition containing silicates/phosphates is mixed with hard water, copious precipitates develop in a short period of time. These precipitates may clog a cooling system, resulting in reduced antifreeze/coolant flow, increased engine operating temperatures and shorter service life. Deposit formation can also result in the physical damage of soft material parts, e.g., water pump seals, engine head seals, hoses, etc. used in the parts and components of the system.

To alleviate the silicate deposit problem, silicate stabilizers can be added to antifreeze compositions. However, at low operating temperatures, e.g., sub-freezing, some additives are not soluble thus further compounding the problem. Ideally, antifreeze compositions should remain transparent and free of insoluble materials in operation as the unwanted formation of deposits/soluble materials decreases the heat transfer property of the composition.

There is still a need for an antifreeze composition, i.e., a glycol based composition, having improved thermal stability at low temperatures with minimal salt/deposition formation.

SUMMARY OF THE INVENTION

In one embodiment, there is provided an antifreeze composition comprising from 50 to 99.8 wt. % of a glycol-based freezing point depressant selected from the group of: alkylene glycols, glycol monoethers, glycerins, and mixtures thereof; 0.1 to 10 wt. % of at least a branched organic acid ($C_5$-$C_{16}$) or alkali- or amino salt of a branched organic acid ($C_5$-$C_{16}$); and 0.1 to 10 wt. % of i) an aliphatic mono acid ($C_5$-$C_{12}$) or alkali- or amino salt of an aliphatic mono acid ($C_5$-$C_{12}$); or ii) a substituted aromatic organic acid ($C_7$-$C_{18}$) or alkali- or amino salt of a substituted aromatic organic acid. In one embodiment, the composition is used as a concentrate in admixture with an aqueous antifreeze solution comprising 10 to 90 wt. % by weight of water.

In another aspect, there is provided an antifreeze composition comprising 85 to 99.8 wt. % of a glycol freezing point depressant selected from the group of: alkylene glycols, glycol monoethers, glycerins, and mixtures thereof; 0.1 to 10 wt. % of at least one of a 2-ethylhexanoic acid, isononanoic acid and 3,5,5-trimethylhexanoic acid; and 0.1 to 10 wt. % of at least one of heptanoic acid, octanoic acid, nonanoic acid, decanoic acid, undecanoic acid, dodecanoic acid, neodecanoic acid, benzoic acid, 2-hydroxybenzoic acid, p-terbutylbenzoic acid, and mixtures thereof.

There is also provided a method to improve the thermal stability of an antifreeze composition comprising blending into the glycol freezing point depressant matrix of an antifreeze concentrate a corrosion inhibitor system comprising: a) 0.1 to 10 wt. % of at least a branched organic acid ($C_5$-$C_{16}$) or alkali- or amino salt of a branched organic acid ($C_5$-$C_{16}$); and b) 0.1 to 10 wt. % of: i) an aliphatic mono acid (C5-C12) or alkali- or amino salt of an aliphatic mono acid ($C_5$-$C_{12}$); or ii) a substituted aromatic organic acid ($C_7$-$C_{18}$) or alkali- or amino salt of a substituted aromatic organic acid.

DETAILED DESCRIPTION

Definitions for the following terms are provided herein to promote a further understanding of the invention.

The term "antifreeze" refers to a composition which reduces the freezing point of an aqueous solution, or is an aqueous solution with a reduced freezing point with respect to water, e.g., a composition comprising a freezing point depressant.

The term "coolant" refers to a category of liquid antifreeze compositions which have properties that allow an engine to function effectively without freezing, boiling, or corrosion. The performance of an engine coolant must meet or exceed standards set by the American Society for Testing and Materials (A.S.T.M.) and the Society of Automotive Engineers (S.A.E.).

The term "heat transfer fluid" refers to a fluid which flows through a system in order to prevent its overheating, transferring the heat produced within the system to other systems or devices that can utilize or dissipate the heat.

The term "de-icing" fluid refers to a fluid which makes or keeps a system, a device, or a part free of ice, or a fluid which melts ice.

As used herein, the term "antifreeze" composition (or fluid or concentrate) may be used interchangeably with "heat transfer," "coolant," or "de-icing" fluid (composition or concentrate).

As used herein, "glycol-based" includes glycols, glycerins, as well as glycol ethers.

In one embodiment of the invention, an antifreeze composition with excellent thermal stability properties is provided. The composition remains relatively clear with minimal deposit formation (that can be visually observed). The composition comprises a combination of corrosion inhibitors in a glycol based freezing point depressant.

Glycol-Based Freezing Point Depressant Matrix: The freezing point depressant component for use as the matrix of the antifreeze/coolant concentrate composition is a glycol or glycol ether, in an amount of 50 to 99.8 wt. % of total weight of a final concentrate composition. In one embodiment, the antifreeze/coolant composition is in admixture with an aqueous antifreeze solution comprising 10 to 90 wt. % by weight of water. Examples include but are not limited to alkylene glycols, such as ethylene glycol, diethylene glycol, propylene glycol, dipropylene glycol; triethylene glycol, tetraethylene glycol, pentaethylene glycol, hexaethylene glycol, dipropylene glycol, tripropylene glycol, tetrapropylene glycol, pentapropylene glycol, hexapropylene glycol and mixtures thereof; glycerin; and glycol monoethers such as the methyl, ethyl, propyl, and butyl ethers of ethylene glycol, and mixtures thereof.

In one embodiment, the matrix comprises an ethylene glycol as the liquid alcohol freezing point depressant component.

Corrosion Inhibitor System: The antifreeze composition further comprises a combination of: a) 0.1 to 10 wt. % of one or more branched organic acids ($C_5$-$C_{16}$) or alkali- or amino salt of the branched organic acids as a first component; and b) 0.1 to 10 wt. % of one or more aliphatic mono acids ($C_5$-$C_{12}$), or substituted aromatic organic acids ($C_7$-$C_{18}$) or alkali- or amino salt of the foregoing acids as a second component. The combination improves the thermal stability of the antifreeze compositions as compared to prior art compositions that contain only aliphatic organic acids or substituted aromatic acids.

In one embodiment, the first component comprising at least one of branched organic acids, salts of branched organic acids, and mixtures thereof. Examples include but are not limited to the following branched $C_4$-$C_{18}$-carboxylic acids and salts thereof: isobutanoic acid, 2-ethylhexanoic acid, isononanoic acid and 3,5,5-trimethylhexanoic acid. In one embodiment, the branched organic first component is 2-ethylhexanoic acid or 3,5,5-trimethylhaxanoic acid.

In one embodiment, the second component is selected from the group of aliphatic mono acids; substituted aromatic organic acids; alkali metal, ammonium, or amine salt of the aforementioned acids; and mixtures thereof.

In one embodiment, the aliphatic mono acid component includes at least a $C_5$-$C_{12}$ aliphatic monobasic acid or the alkali metal, ammonium, or amine salt thereof Examples of the acids or isomers include but are not limited to heptanoic, octanoic, nonanoic, decanoic, undecanoic and dodecanoic, and mixtures thereof. Any alkali metal, ammonium, or amine can be used to form the monobasic acid salt. In one embodiment, the second component comprises at least an alkali metal of the aliphatic mono acids with sodium and potassium being used as the alkali metals for use in forming the monobasic acid salt. In a third embodiment, octanoic acid is used as the second component.

Examples of aromatic organic acids and hydroxyl-substituted aromatic organic acids include but not limited to benzoic acids, $C_1$-$C_8$-alkylbenzoic acids/salts thereof, for example o-, m- and p-methylbenzoic acid or p-tert-butylbenzoic acid, $C_1$-$C_4$-alkoxybenzoic acids, for example o-, m- and p-methoxybenzoic acid, hydroxyl-containing aromatic monocarboxylic acids, for example o-, m- or p-hydroxybenzoic acid, o-, m- and p-(hydroxymethyl)benzoic acid, a halobenzoic acids, for example o-, m- or p-fluorobenzoic acid. In one embodiment, the aromatic organic acid is selected from 2-hydroxybenzoic acid, p-terbutylbenzoic acid, mandelic acid and homophthalic acid and salts thereof.

In one embodiment, the carboxylic acids mentioned are present as alkali metal salts, e.g., sodium or potassium salts, or as ammonium salts or substituted ammonium salts (amine salts), for example with ammonia, trialkylamines or trialkanolamines.

In one embodiment, the approximate proportions of the corrosion inhibitor package are (based on the amount of the glycol freezing point depressant present) are: about 0.1 to 15.0 wt. % of the first component and about 0.1 to 15.0 wt. % of the second component. In a second embodiment, the amount of either the first or the second component is in the range of 0.1 to 10 wt. %. In a third embodiment, either component is present in an amount of 0.5 to 3 wt. %. In a fourth embodiment, the system comprises 1-3 wt. % of the first component and 1-3 wt. % of the second component, with the ratio of the first to the second component in the range of 3:1 to 1:3.

In one embodiment and after being diluted with water, the antifreeze composition comprises 1 to 3 wt. % of a branched acid selected from 2-ethylhexanoic acid and 3,5,5-trimethylhexanoic acid; 1 to 3 wt. % of at least one of: benzoic acid, octanoic acid, p-tertbutylbenzoic acid, and mixtures thereof, in a matrix of 50-60 wt. % (based on the final weight of the diluted composition) of at least one of mono ethylene glycol (MEG) and mono propylene glycol (MPG). In yet another embodiment, the diluted composition comprises about 53-57 wt. % of a MEG or MPG matrix and a corrosion inhibitor system comprising 1-2 wt. % benzoic acid and 1-2 wt. % 2-ethylhexanoic acid. In a third embodiment, the corrosion inhibitor system comprises 1-2 wt. % 3,5,5-trimethylhexanoic acid and 1-2 wt. % p-tertbutylbenzoic acid.

Additional/Optional Components: In one embodiment, the antifreeze composition further comprises one or more additional conventional corrosion inhibitors in combination with the above-described components, at concentrations of 0.01-10.0 wt. % (based on the weight of the freezing point depressant matrix). Examples of optional conventional corrosion inhibitors include alkali metal borates, alkali metal silicates, alkali metal benzoates, alkali metal nitrates, alkali metal nitrites, alkali metal molybdates, and hydrocarbyl thiazoles. In one embodiment, the additional corrosion inhibitor is selected from hydrocarbyl triazoles, hydrocarbyl thiazoles, sodium metasilicate pentahydrate, organosilane stabilizers, and mixtures thereof. Suitable hydrocarbyl triazoles include aromatic triazoles or alkyl-substituted aromatic triazoles, e.g., benzotriazole or tolyltriazole, at a concentration of 0.01-0.5 wt. %. In yet another embodiment, the antifreeze composition comprises 0.2 to 5 wt. % of a sulfite or an alkali metal salt of sulfurous acid as an additional corrosion inhibitor.

In one embodiment, the antifreeze composition further contains other additives in an amount of 0.05 to about 0.1 wt. % (based on the weight of the freezing point depressant matrix) such as antioxidants, anti-wear agents, detergents, antifoam agents, acid-base indicators, dyes and the like, provided that the additives are soluble and thermally stable at low temperatures.

Examples of antifoam agents used include but are not limited to polyalkylene oxide having a molecular weight of from about 1,000 to about 4,000; silicon oils such as dimethylpolysilozane; and organic silicon compounds such as diethyl silicates.

Examples of antioxidants include but are not limited to phenols, such as 2,6di-t-butyl methylphenol and 4,4'-methylene-bis(2,6-di-t-butylphenol); aromatic amines, such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthatalamines and alkyl-phenyl-2-naphthal-amines, as well as sulphur-containing compounds, e.g. dithiophosphates, phosphitest, sulphides and dithio metal salts, such as benzothiazole, tin-dialkyldithiophosphates and zinc diaryldithiophosphates.

Examples of antiwear agents include but are not limited to phosphates, phosphate esters, phosphites, thiophosphites, e.g. zinc dialkyl dithiophosphates, zinc diaryldithiophosphates, tricresyl phosphates, chlorinated waxes, sulphurised fats and olefins, such as thiodipropionic esters, dialkyl sulphides, dialkyl polysulphides, alkyl-mercaptanes, dibenzothiophenes and 2,2'-dithiobis(benzothiazole); organic lead compounds, fatty acids, molybdenum complexes, such as molybdenum disulphide, halogen substituted organosilicon compounds, organic silicon compounds, borates and halogen-substituted phosphorus compounds.

Examples of detergents include but are not limited to sulphonates, aromatic sulphonic acids, which are substituted with alkyl having a long chain, phosphonates, thiophosphonates, phonolates, metal salts of alkylphenols, and alkyl sulphides.

In one embodiment, a sufficient amount of at least an alkali metal hydroxide, e.g., NaOH or KOH, is added to the composition to modify the pH of the formulation to between 6.5 to 11. In yet another embodiment, a sufficient amount of NaOH is added the composition for the pH to be between 7 and 9.

Method for Making: The corrosion inhibitor combination and optional additives can be blended into the glycol freezing point depressant matrix individually or in various sub-combinations to formulate the antifreeze composition. Depending on the amount of freezing point depressant used, the composition can be in the form of a "concentrate," which can be used as is or to be further diluted. In one embodiment, the concentrate is diluted with about 10-90 vol. % water prior to being used in cooling system or as an anti-freeze/de-icing fluid. In a second embodiment, the anti-freeze composition is diluted with 25 to 60 vol. % water. In a third embodiment, the amount of water added is between 30% to 50 wt. %. In a fourth embodiment, the corrosion inhibitor combination is employed in admixture with an aqueous antifreeze/coolant solution comprising 10% to 90% by weight of water, an ethylene glycol freezing point depressant, and at least one alkali metal hydroxide which is employed to adjust the pH of the composition to a range from about 6.5 to 9.5.

Properties: The composition is characterized as exhibiting excellent protection against the corrosion of metals. The composition is further characterized as being thermally stable.

As used herein, "thermally-stable" means a sample of the antifreeze composition forms less than 2% precipitate when chilled at 0° C. for at least 24 hours. In another embodiment, "thermally-stable" means that less than 2% of the composition precipitates when chilled at −15° C. for at least 24 hours. In yet another embodiment, the term means that the composition is relatively free of precipitates (as visually observed) after being chilled at −15° C. for at least 24 hours. In a third embodiment, the term means that the composition forms less than 1 wt. % precipitates when chilled at −15° C. for at least 24 hours. In a fourth embodiment, the composition forms less than 1 wt. % precipitates when chilled at −25° C. for at least 24 hours. As used herein, "precipitates" means broadly to include insolubles, coagulants, flocculants, solids and/or fine particles, needles (from crystallization), crystals, gels, colloidal formations, aggregated or precipitated lumps, clusters, or granules which may suspend, deposit, or settle in the antifreeze composition.

In one embodiment, the composition exhibits improved thermal stability properties compared to the compositions of the prior art, wherein the composition remains relatively free of insolubles/precipitates at a freezing or sub-freezing temperature and after a period of at least 24 hours. In one embodiment, the composition remains relatively transparent after at least 24 hours at a temperature of less than 0° C. In another embodiment, the composition remains thermally stable at a temperature of less than −5° C. In a third embodiment, the composition remains thermally stable at a temperature of less than −10° C. In a fourth embodiment, the composition remains thermally stable at a temperature of less than −20° C.

Applications: Due to the improved thermal stability property and the excellent protection provided by the corrosion inhibitor system, the antifreeze composition is especially useful in applications where it is desirable to provide long service life with minimal fluid change-outs or fluid modifications once in service. In one embodiment, the antifreeze composition is used in applications in which heat is to be supplied to petroleum materials drilled or transported in cold climates to improve the fluidity and decrease the viscosity of the petroleum materials. In another embodiment, the composition is also useful in conventional applications for heat transfer fluids, such as coolants in industrial engines.

The following Examples are given as non-limitative illustration of aspects of the present invention.

EXAMPLES

Unless specified otherwise, the compositions are prepared by mixing the components in the amounts indicated in Table 2. The components used in the Examples and the corresponding "code" in the tables are listed below. All components are commercially available from a number of sources.

Octanoic acid: C8.
2-ethylhexanoic acid: 2-eha.
3,5,5-trimethylhexanoic acid (Cekanoic acid): TMHA.
Benzoic acid: BA.
p-tertButylbenzoic acid: PTBA.
Mono ethylene glycol (MEG) and mono propylene glycol (MPG): glycol-based freezing point depressants used in the Examples.

The antifreeze compositions were placed in glass vials and placed in climate chambers maintained at the specified temperatures in Table 1. After 24 hours, the glass vials were taken out and visually evaluated. Observations about the liquid samples in the examples (as indicated in Table 2) were made according to the guidelines in Table 1 below:

TABLE 1

| | Coding Showing Precipitates | | | |
|---|---|---|---|---|
| | Not present | Trace | Moderate | Severe |
| Haziness | H | — | TH | MH | SH |
| Gel formation | G | — | TG | MG | SG |
| Flocculation | F | — | TF | MF | SF |
| Needles | N | — | TN | MN | SN |
| Precipitation | P | — | TP | MP | SP |

If the liquid is observed to be slightly hazy, a code of "TH" is used. If the liquid is very hazy with trace of precipitate, then "SH+TP" is used. If the liquid is clear, but needles are observed inside (more than just a few) then a code "MN" is used. If the liquid is slightly hazy, with a lot of gel on the glasswall, and with a trace of flocculation, then a code of "TH+SG+TF" is used. If the liquid is clear (no instability) then the "OK" code is used.

In examples 1-16, each antifreeze composition employs 56 wt. % MEG (based on the final weight on the composition), the organic acid content in wt. % as specified in the table, a sufficient amount of KOH for the sample pH to be between 6.8 and 7.2, and the remainder water. In examples 17-30, each example employs 57 wt. % MPG (based on the final weight on the composition), specified organic acid contents, a sufficient amount of KOH for the sample pH to be between 5.8 and 6.2, and water.

For the purposes of this specification and appended claims, unless otherwise indicated, all numbers expressing quantities, percentages or proportions, and other numerical values, are to be understood as being modified in all instances by the term "about." Accordingly, unless indicated to the contrary, the numerical parameters set forth are approximations that may vary depending upon the desired properties sought to be obtained by the present invention. It is noted that as used herein, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

Table 3 illustrates the relative stability of solutions comprising a mixture of a branched organic acid, (specifically 2-ethylhexanoic acid) and an aliphatic monoacid, (specifically heptanoic acid or dodecanoic acid) when only the two additives are present, as well as when further combined with a dicarboxylic acid such as sebacic acid. A precipitating agent, a 4 mmol $CA^{+2}$ solution is added under different conditions of temperature and allowed to stand for differing lengths of time. Each of these acids is, in certain embodiments an element of the antifreeze of the current invention. In each mixture where a dicarboxylic acid is present, a precipitate forms within 24 hours of addition of the precipitating agent. This indicates that the presence of dicarboxylic acid introduces an element of instability into the antifreeze solution of this invention, causing decomposition.

TABLE 2

| Example | Organic acid content | +20° C. | +10° C. | +5° C. | 0° C. | −5° C. | −10° C. | −15° C. | −20° C. | −25° C. | −30° C. | −35° C. |
|---|---|---|---|---|---|---|---|---|---|---|---|---|
| 1 | 3 w % Octanoic acid (C8) | TH | TP | MF | MF | MN | SN | SN | SN | SF | SF/G | SF/G |
| 2 | 2 w % C8 | OK | TP | TP | TP | MF | SF | SF | SF | SF | SF/G | SF/G |
| 3 | 3 w % PTBA | OK | TP | TP | TP | SN | SN | SN | SN | SN | SG, SH | SG, SH |
| 4 | 3 w % 2-eha | OK | TP | OK | TP | TP | TP | TP | OK | TP | OK | OK |
| 5 | 3 w % TMHA | OK | TP | TP | TP | TP | TP | OK | TP | OK | OK | OK |
| 6 | 3 w % Benzoic acid (BA) | OK | TP | TP | TP | TP | TP | OK | OK | OK | OK | OK |
| 7 | 2 w % PTBA | TP | TP | TP | TP | TP | TP | TP | MN | MN | MN | MN |
| 8 | 2 w % BA + 1w % 2-eha | OK | TP | TP | TP | TP | TP | OK | TP | TP | OK | OK |
| 9 | 1 w % BA + 2w % 2-eha | OK | TP | TP | TP | TP | TP | TP | TP | TP | OK | OK |
| 10 | 2 w % PTBA + 1w % 2-eha | OK | TP | TP | TP | TP | TP | OK | TP | MF | SH | SH |
| 11 | 1 w % PTBA + 2w % 2-eha | OK | TP | TP | TP | TP | TP | TP | TP | OK | OK | MF |
| 12 | 2 w % BA + 1w % TMHA | OK | TP | TP | TP | TP | TP | TP | TP | TP | OK | OK |
| 13 | 1 w % BA + 2w % TMHA | OK | TP | TP | TP | TP | TP | OK | TP | TP | OK | OK |
| 14 | 2 w % PTBA + 1w % TMHA | OK | TP | TP | TP | TP | TP | OK | TP | MP | OK | OK |
| 15 | 1 w % PTBA + 2w % TMHA | OK | TP | OK | TP | TP | TP | TP | OK | OK | OK | OK |
| 16 | 3 w % PTBA + 2w % TMHA | TP | TP | TP | TP | TP | OK | OK | OK | OK | OK | OK |
| 17 | 3 w % Octanoic acid (C8) | TP | TP | TP | TP | TP | SG | SG | SG | SG | SG | SG |
| 18 | 3 w % 2-eha | TP | TP | TP | TP | TP | CL | SH | SH | SH | SH/MG | SH/MG |
| 19 | 3 w % TMHA | TP | TP | TP | TP | TP | MH | SH | SH | SH | SH/MG | SH/MG |
| 20 | 3 w % Benzoic acid (BA) | TP | TP | TP | TP | TP | MN | SN | SN | SN | SN/G | SN/G |
| 21 | 3 w % PTBA | SG | SG | SG | SG | SG | SG | SG | SG | SG | SG | SG |
| 22 | 2 w % BA + 1w % 2-eha | TP | TP | TP | TP | TP | CL | CL | CL | CL | CL | CL |
| 23 | 1 w % BA + 2w % 2-eha | TP | TP | TP | TP | TP | CL | CL | CL | CL | SF/MG | SG |
| 24 | 1 w % PTBA + 2w % 2-eha | TP | TP | TP | MF | MF | MF | MF | MF/MP | SF | SF | SF/P |
| 25 | 2 w % C8 + 1w % TMA | TP | TP | TP | TP | TP | CL | SN | SN/SG | SN/SG | SG | SG |
| 26 | 1 w % C8 + 2w % TMHA | TP | TP | TP | TP | TP | CL | SH/MF | SH/MF | SH/MF | SH/MG | SH/MG |
| 27 | 2 w % BA + 1w % TMHA | TP | TP | TP | TP | TP | CL | CL | CL | MH | SH/MG | SH/MG |
| 28 | 1 w % PTBA + 2w % TMHA | TP | TP | TP | TP | TP | TP | SG | SG | SG | SG | SG |

TABLE 3

| Additives | Dilution | 24 h at 25° C. | 24 h at 90° C. | 48 h at 25° C. |
|---|---|---|---|---|
| | | Blank - No precipitating agents added | | |
| 3.5 w % heptanoic acid + 1.0 w % 2-ethylhexanoic acid | 33 | Clear | Clear | Clear |
| 3.5 w % sebacic acid + 1.0 w % 2-ethylhexanoic acid | 33 | Clear | Clear | Clear |
| 3.375 w % 2-ethylhexanoic acid + 0.95 w % dodecanoic acid + 0.175 w % Sebacic acid | 33 | Clear | Clear | Clear |
| 3.25 w % 2-ethylhexanoic acid + 0.9 w % dodecanoic acid + 0.35 w % Sebacic acid | 33 | Clear | Clear | Clear |
| 3 w % 2-ethylhexanoic acid + 0.8 w % dodecanoic acid + 0.7 w % Sebacic acid | 33 | Clear | Clear | Clear |
| 2.5 w % 2-ethylhexanoic acid + 0.6 w % dodecanoic acid + 1.4 w % Sebacic acid | 33 | Clear | Clear | Clear |

TABLE 3-continued

| Additives | Dilution | 24 h at 25° C. | 24 h at 90° C. | 48 h at 25° C. |
|---|---|---|---|---|
| | | 4 mmol $CA^{2+}$ Added as precipitating agent | | |
| 3.5 w % heptanoic acid and 1.0 w % 2-ethylhexanoic acid | 33 | Clear | Clear | Clear |
| 3.5 w % sebacic acid + 1.0 w % 2-ethylhexanoic acid | 33 | Clear | Clear | Clear |
| 3.375 w % 2-ethylhexanoic acid + 0.95 w % dodecanoic acid + 0.175 w % Sebacic acid | 33 | 3.5 ml deposit, flocks in solution | 4.5 ml deposit | 4.5 ml deposit |
| 3.25 w % 2-ethylhexanoic acid + 0.9 w % dodecanoic acid + 0.35 w % Sebacic acid | 33 | 4 ml deposit, flocks in solution | 3 ml deposit | 3 ml deposit |
| 3 w % 2-ethylhexanoic acid + 0.8 w % dodecanoic acid + 0.7 w % Sebacic acid | 33 | 1 ml deposit, flocks in solution | 0.9 ml deposit | 0.9 ml deposit |
| 2.5 w % 2-ethylhexanoic acid + 0.6 w % dodecanoic acid + 1.4 w % Sebacic acid | 33 | Clear | <0.1 ml deposit | <0.1 ml deposit |

All blends contain: 90 w % monoethylene glycol and have a pH of 8.4 to 8.8 using sodium hydroxide as neutralization agent.
Make up to 100 w % was done with de-ionized water

The invention claimed is:

1. An antifreeze composition consisting essentially of from 50 to 99.8 wt. % of a glycol freezing point depressant selected from the group of: alkylene glycols, glycol monoethers, glycerins, and mixtures thereof; 0.1 to 5 wt. % of at least one of a 2-ethylhexanoic acid, isononanoic acid and 3,5,5-trimethylhexanoic acid; and 0.1 to 5 wt. % of at least one of heptanoic acid, octanoic acid, nonanoic acid, decanoic acid, undecanoic acid, dodecanoic acid, neodecanoic acid, and mixtures thereof and wherein less than 1% of the composition precipitates when the composition is chilled at –0° C. for at least 24 hours.

2. The antifreeze composition of claim 1, wherein less than 2 wt. % of the composition precipitates when the composition is chilled at –0° C. for at least 24 hours.

3. The antifreeze composition of claim 2, wherein less than 2 wt. % of the composition precipitates when the composition is chilled at –15° C. for at least 24 hours.

4. The antifreeze composition of claim 1, wherein the composition is diluted with 10-90 vol. % water prior to being used in a cooling system or as an anti-freeze/de-icing fluid.

* * * * *